G. I. LEONARD.
STRUCTURE FORMED OF MATERIALS HAVING DIFFERENT COEFFICIENTS OF EXPANSION.
APPLICATION FILED JAN. 2, 1918.
1,304,993.
Patented May 27, 1919.
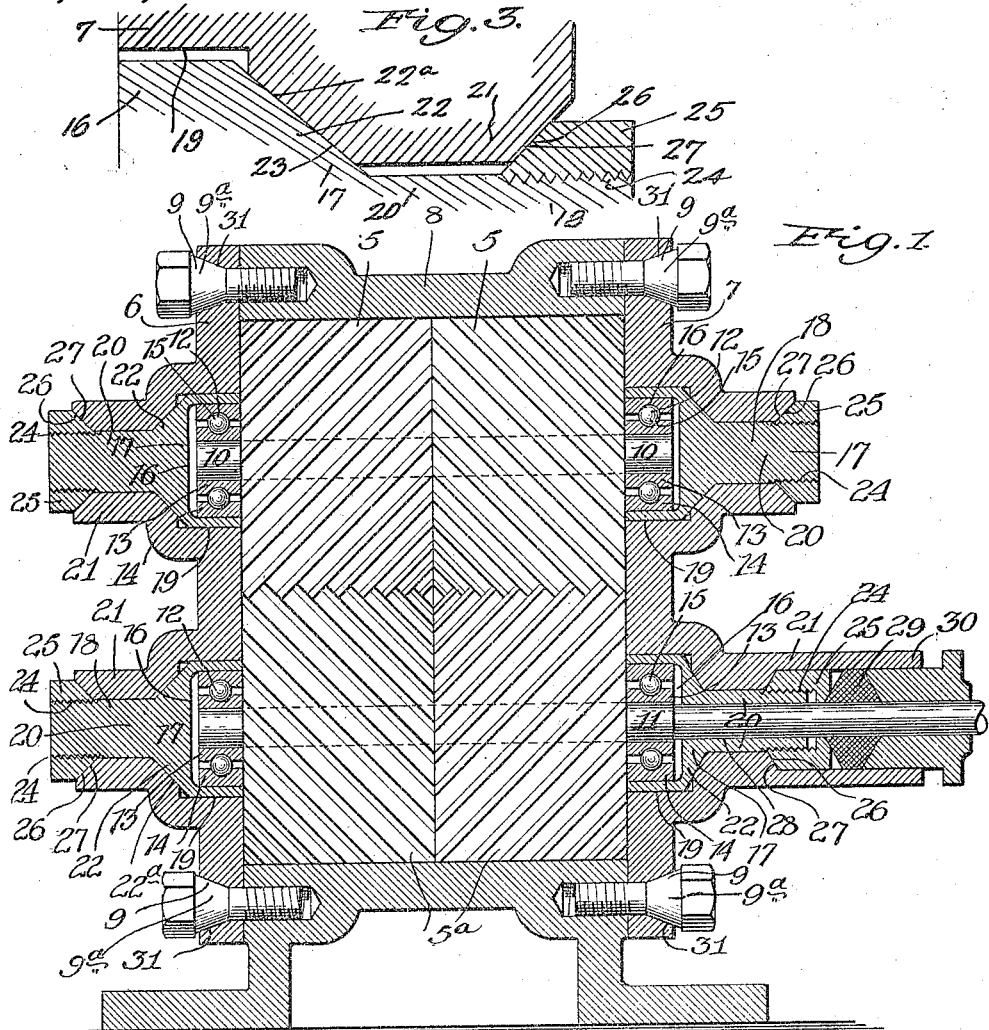
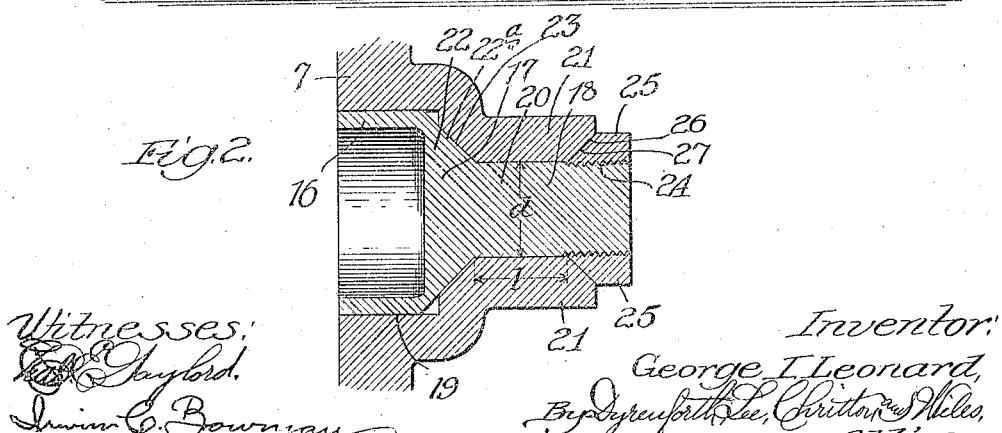

UNITED STATES PATENT OFFICE.

GEORGE I. LEONARD, OF CHICAGO, ILLINOIS, ASSIGNOR TO LEONARD VALVELESS ENGINE COMPANY, A CORPORATION OF MAINE.

STRUCTURE FORMED OF MATERIALS HAVING DIFFERENT COEFFICIENTS OF EXPANSION.

1,304,993.     Specification of Letters Patent.     Patented May 27, 1919.

Application filed January 2, 1918. Serial No. 210,038.

*To all whom it may concern:*

Be it known that I, GEORGE I. LEONARD, a citizen of the United States, residing at Chicago, in the county of Cook and State of Illinois, have invented a new and useful Improvement in Structures Formed of Materials Having Different Coefficients of Expansion, of which the following is a specification.

My invention relates, generally stated, to the securing together of parts formed of materials having different coefficients of expansion and which in use are subjected to changes in temperature, my invention having been devised for use, more particularly, but not to the exclusion of other uses, in connection with the bearings of structures, such as gear pumps, engines, and other structures, involving opposed coöperating, journaled elements, such as intermeshing gears arranged to rotate on parallel axes where the parts of such structures are subjected to changes in temperature.

Structures of the general construction above-referred-to as hitherto provided present as an objection, in general, that under changes in temperature the parts thereof of different coefficients of expansion, become relatively displaced, under some conditions producing loosening of the parts and under others subjecting them to damaging stresses, with the manifest objections.

As to the structures for use in connection with which my invention was more particularly devised as above stated, it is desirable that the casings for the operative parts be made of relatively light metal, such as aluminum, or an aluminum alloy, and that the bearings for these operative parts, and which are journaled in the casing, be made of steel. This condition, as structures of this character have been hitherto provided, presents a serious disadvantage when the structure becomes heated as, for example, in the operation thereof, as in the case of compressors as these different metals have different coefficients of expansion, the casing metal having a higher coefficient than the bearing metal, which causes these parts to expand and contract relatively unequally, and thus the operative elements referred to, as for example, the intermeshing opposed gears, are permitted to spread apart from a position in which they coöperate, caused by the bearings in the casing becoming loose in the latter, and the proper fit of the operative elements with each other is destroyed, with the result of reducing the efficiency of the structure as a pump, engine or for such other purpose as it is provided.

My primary objects are generally to provide for the holding of the parts formed of material presenting different coefficients of expansion, in the desired relative positions under variations in temperature to which these parts are subjected, and more particularly as to structures having opposed elements as above stated, to provide for the maintaining of the bearings of the opposed coöperating elements in the structure as above referred to, in centralized position relative to their supports for maintaining these coöperating elements in the necessary relative positions for effecting the proper coöperation of these parts, during variations in the temperature to which the structure is subjected, and to accomplish this result in a simple and economical manner.

Referring to the accompanying drawing wherein I have shown my invention as applied to a structure of the character just referred to; Figure 1 is a view in vertical sectional elevation of a compressor of the intermeshing-gear type, embodying my invention, its embodiment in a structure of this particular kind being by way of illustration only, and therefore without any intention of limiting the invention to its use in a structure of this kind or provided for such use. Fig. 2 is a diagram for explaining the various factors of the formula hereinafter referred to and suitable for use in determining the proportions of certain parts of the structure; and Fig. 3, a view like Fig. 2 with portions broken away showing in an exaggerated manner the relative shifting of the parts illustrated in the particular construction presented, when subjected to heat.

The casing of the compressor shown is provided for inclosing intermeshing gears, represented at 5 and 5ª, each being shown as of the herringbone type, the casing inclosing the gears except at an inlet and outlet (not shown) provided therein in accordance with common practice. The casing is formed of the end-plates 6 and 7, with the interposed, hollow, open-ended section 8, which fits at its ends against the inner faces of the end-plates 6 and 7, these casing parts being secured together by cap-screws 9.

The bearings for the shafts 10 and 11, carrying the gears 5 and 5ª, respectively, are represented at 12, and by preference, are of the ball-type, formed of inner and outer race-members 13 and 14, respectively, with balls 15 interposed therebetween. The outer races 14 fit tightly within sockets 16 in the inner headed ends 17 of supporting members 18, these heads extending into sockets 19 in the inner surfaces of the end-plates 6 and 7. The outer ends of the supporting members 18 are of reduced diameter, as represented at 20, and extend through bosses 21, shown as formed integrally with, and extending laterally from, the end-plates 6 and 7. The heads 17 are of frusto-conical form at the portions thereof adjacent the reduced portions 20, as indicated at 22, and at their tapering outer surfaces 22ª thus provided, fit against correspondingly tapered or annular surfaces 23 on the casing-plates 6 and 7 located intermediate the sockets 19 and the portions of the bosses 21, through which the reduced portions 20 of the members 18 extend. The outer ends of the members 18 are externally threaded, as represented at 24, and upon these portions nuts 25 are screwed. The inner faces of the nuts 25 are of frusto-conical shape, as represented at 26, and bear against annular correspondingly tapered surfaces 27 on the bosses 21, the surfaces 26 and 27 extending at the same angle relative to the axes of the shafts with which they coöperate, as do the tapered surfaces 22 and 23, but in the opposite direction. It will be noted that in the construction shown the shaft 11 is a drive-shaft and, therefore, extends to the exterior of the casing, this shaft extending through an opening 28 in the coöperating supporting member 18 and through a packing device 29, surrounding this shaft and located within an annular extension 30 on the boss with which it coöperates.

In constructing the device the supporting members 18 and nuts 24 would be made of the same material as that from which the bearings supported by these members, are made, or of other material having the same, or substantially the same, coefficient of expansion; and the gears 5 and 5ª and shafts 10 and 11 would be made of the same material as that forming the casing, or of other material having the same, or substantially the same, coefficient of expansion; the material of the members 18 and nuts 25, in the particular illustration presented, having a lesser coefficient of expansion than the material of which the gears 5 and 5ª and shafts 10 and 11 are constructed.

In practice it is desirable that the parts of the structure be of such proportions that the supporting members 18 be held under uniform tension in the bosses 21, under changes in temperature of these parts, or, in other words, that the tension of the heads 22 and nuts 25 be substantially constant. As a means of determining the proper proportioning of the supporting members 18 and bosses 21, the following formula may be employed, wherein $d$ represents the diameter of the reduced portion of member 18 and indicated by the dimension line $d$; $l$, the length of the boss 21 along the dimension line $l$; $c$, the difference in coefficients of expansion of the metals forming the supporting members 18 and bosses 21; $t$, the amount of temperature change; the formula being as follows:

Where the structure being considered is conical at opposite ends, as shown, the derivation of this formula is as follows:

$\frac{d}{2} \times c \times t$ = diametric expansion on one side of center:

$l \times c \times t$ = expansion on the length:

$\dfrac{\frac{d}{2} \times c \times t}{l \times c \times t}$ = the tangent of the angle at which the surfaces 22, 23, 10, and 26 extend relative to the axes of the respective gears.

$l = \dfrac{\frac{d}{2}}{\text{tangent angle}}$:

and considering both ends conical, then $l = 2\left(\dfrac{\frac{d}{2}}{\text{tangent angle}}\right) = \dfrac{d}{\text{tangent angle}}.$ It will be noted from the foregoing evolutions of the formula that the difference in coefficients of expansion and temperature change cancel out of the equation leaving the factor $d$ and the tangent of the angle, the only factors to be considered. Thus in the particular construction illustrated where the angle at which the surfaces 22, 23, 10, and 26 extend relative to the axes of the gears, as to all the bearings except the one through which the drive-shaft extends, is 45 degrees, and assuming the diameter of the reduced portions of these supporting members to be $\frac{5}{8}''$, the computation would be as follows:

$\dfrac{\frac{5}{8}''}{1 \text{ the tangent of angle of 45 degrees}} = \frac{5}{8}''$ and thus the bosses for these particular supporting members should be $\frac{5}{8}''$ along the dimension line $l$.

It is preferred that where space will permit, as in the case of the supporting members for the bearings other than those at the boss 21 through which the drive-shaft 11 extends, the angle at which the tapered surfaces above referred to extend relative to the axes of the shafts, be substantially 45 degrees as above stated, but where it is desired to shorten the boss along the dimension line $l$, the angle at which the opposed tapered surfaces referred to extend, may be made greater. This is illustrated in connection with the supporting member through which the shaft 11 extends, in the case illustrated the angle at which these surfaces extend being 60 degrees. Applying the above-referred-to formula to the structure just referred to, the length of that portion of the boss 21 corresponding with the part to which the dimension line $l$ is applied in Fig. 2, where the reduced portion of the supporting member is $\frac{5}{8}''$ in diameter, would be $.3608''$, the tangent of the angle of 60 degrees being 1.732. In the subjection to heat of the particular construction illustrated and described, the members 21 expand at a greater rate than the members 18, and while in thus expanding the members 21 become spaced from the members 18, as illustrated in an exaggerated manner in Fig. 3, the inclined surfaces 26 and 27, and 22$^a$ and 23 remain in the desired contact.

While it is preferred that there be engagement at tapered surfaces between the supporting members 18, considering the nuts 25 as parts of these members, with oppositely facing surfaces on the bosses 21, it is possible to provide for the holding of the supporting members in the bosses through which they extend, with a uniform tension, where a taper surface is provided at one end only of the structure now under consideration and this surface be on either the boss or the supporting member, and the opposite end of the supporting member present a right-angled shoulder portion which abuts against a similarly disposed surface on the boss with which it coöperates. By way of example, it may be stated that instead of providing the tapered surface 27 on the boss and the tapered surface 26 on the nut, these faces can be disposed at an angle of 90 degrees to the axes of the shafts 10 and 11 and thus present flatwise abutting surfaces, and the opposite end of the supporting member and the adjacent surface of the boss through which it extends may be both tapered as above explained or one only thereof, the other member in such case merely having line contact with the one of the elements presenting the tapered surface. It is probable, however, that the bearing members 18 would not, if constructed in accordance with the modification just referred to, be held as securely in centralized position relative to the bosses as compared with the construction as illustrated and hereinbefore described. In the case of the modification above set forth, the length of the boss along its shortest internal lengthwise-extending portion, and which would correspond with the part represented by the dimension line $l$ in Fig. 1, may be determined by the following formula:

$$l = \frac{\frac{d}{2}}{\text{tangent of angle,}}$$

the characters of this formula being the same as in the previously stated formula.

As hereinbefore stated, my invention also has utility in structures other than those involving bearings as illustrated in the accompanying drawing, and as an example of other uses to which the invention may be put, I cite the instance of the employment of the invention in connection with bolts or screws associated with structural elements having a different coefficient of expansion, and as a more specific example, I cite the case of the bolting together of a plurality of members by iron or steel bolts, where one or more of the members so bolted together present a coefficient of expansion different from that of the metal of which the bolts are made and which, where the structure is formed in accordance with previous practice would result in the shearing of the heads from nuts on the bolts upon increasing the temperature of these parts. In this connection reference is made to the drawing in this application wherein the invention is shown as applied to the cap-screws 9 which, as will be noted, are formed with the frusto-conical surfaces 9$^a$ presenting the desired taper and which fit against the correspondingly tapered surfaces 31 provided in these end plates.

While I have illustrated and described a particular construction in which my invention is embodied, I do not wish to be understood as intending to limit it thereto as the same may be variously modified without departing from the spirit of my invention; nor do I wish to be understood as intending to limit my invention to use in the general type of structure more particularly referred to herein.

What I claim as new and desire to secure by Letters Patent is—

1. The combination of a member, and a second member shouldered at opposite ends and confined at its shoulders in said first-named member, said members having different coefficients of expansion, the whole being so constructed and arranged as to cause the stress on said shoulders to be maintained substantially constant under variations in temperature to which said members are subjected.

2. The combination of a member presenting oppositely-facing surfaces, and a second member in said first-named member of a material having a different coefficient of expansion, said oppositely-facing surfaces being angularly disposed relative to the axis of said second member and said second member having surfaces which oppose and engage said oppositely-facing surfaces, certain of said surfaces inclining relative to the axis of said second member at such an angle as to cause the stress against said coöperating surfaces to be maintained substantially and constant under variations in temperature to which the structure is subjected.

3. The combination of a member presenting oppositely-facing surfaces, and a second member in said first-named member of a material having a different coefficient of expansion, said oppositely-facing surfaces being angularly disposed relative to the axis of said second member and said second member having surfaces which oppose and engage said oppositely-facing surfaces, certain of said oppositely-facing surfaces and certain of said surfaces on said second member inclining relative to the axis of said second member at such an angle as to cause the stress against said coöperating surfaces to be maintained substantially constant under variations in temperature to which the structure is subjected.

4. The combination of a member presenting oppositely-facing surfaces, and a second member in said first-named member of a material having a different coefficient of expansion, said oppositely-facing surfaces being angularly disposed relative to the axis of said second member and said second member having surfaces which oppose and engage said oppositely-facing surfaces, all of said surfaces inclining relative to the axis of said second member at such an angle as to cause the stress against said coöperating surfaces to be maintained substantially constant under variations in temperature to which the structure is subjected.

5. In a structure comprising opposed, rotary, elements, the combination of a support, and bearing members for said elements in said support, said support and bearing members having different coefficients of expansion and said bearing members having shoulders at opposite ends engaging said support, the whole being so constructed and arranged as to cause the shoulders of said bearing members to be maintained in contact with said support and said bearing members to be maintained centralized relative to the positions they originally occupy, under variations in temperature to which the structure is subjected.

6. In a structure comprising opposed, rotary, elements, the combination of a support, and bearing members for said elements in said support, said support and bearing members having different coefficients of expansion and said bearing members having heads at opposite ends engaging said support, the whole being so constructed and arranged as to cause the stress exerted against said heads to be maintained substantially constant under variations in temperature to which the structure is subjected.

7. In a structure comprising opposed, rotary, elements having their axes substantially parallel, the combination of a support presenting oppositely-facing surfaces, and bearing members for said elements, said bearing members being located in said support, said support and bearing members having different coefficients of expansion, the oppositely-facing surfaces on said support being angularly disposed relative to the axis of said elements, and said bearing members having surfaces which oppose and engage said oppositely-facing surfaces, certain of said surfaces inclining relative to the axis of said elements at such an angle as to cause the stress against said coöperating surfaces to be maintained substantially constant under variations in temperature to which the structure is subjected.

8. In a structure comprising opposed, rotary elements having their axes substantially parallel, the combination of a support presenting oppositely-facing surfaces, and bearing members for said elements, said bearing members being located in said support, said support and bearing members having different coefficients of expansion, certain of said oppositely-facing surfaces and certain of said surfaces on said bearing members inclining relative to the axes of said elements at such an angle as to cause the stress against said coöperating surfaces to be maintained substantially constant under variations in temperature to which the structure is subjected.

9. In a structure comprising opposed, rotary elements having their axes substantially parallel, the combination of a support presenting oppositely-facing surfaces, and bearing members for said elements, said bearing members being located in said support, said support and bearing members having different coefficients of expansion, all of said surfaces inclining relative to the axes of said elements at such an angle as to cause the stress exerted against said coöperating surfaces to be maintained substantially constant under variations in temperature to which the structure is subjected.

10. In a structure comprising opposed, rotary elements having their axes substantially parallel, the combination of a support, bearing members for said elements in said support, said support and elements being formed of material having substantially the same coefficients of expansion, but a different coefficient of expansion than the material of which said bearing members are constructed, said bearing members having heads at opposite ends engaging said support, the whole being so constructed and arranged as to cause the heads of such bearing members to be maintained in contact with said support and substantially centralized relative to the original position of said bearing members, under variations in temperature to which the structure is subjected.

GEORGE I. LEONARD.

Copies of this patent may be obtained for five cents each, by addressing the "Commissioner of Patents, Washington, D. C."